United States Patent [19]

Sako

[11] Patent Number: 5,694,381

[45] Date of Patent: Dec. 2, 1997

[54] INFORMATION DATA REPRODUCING SYSTEM, REPRODUCING APPARATUS, REPRODUCING METHOD, DATA FORMING APPARATUS, AND DATA RECORD MEDIUM

[75] Inventor: Yoichiro Sako, Chiba, Japan

[73] Assignee: Sony Corporation, Tokyo, Japan

[21] Appl. No.: 658,503

[22] Filed: Jun. 5, 1996

[30] Foreign Application Priority Data

Jun. 6, 1995 [JP] Japan .................... 7-162854

[51] Int. Cl.⁶ .......................................... G11B 7/00
[52] U.S. Cl. ................... 369/58; 369/47; 369/48; 369/59
[58] Field of Search .................... 369/48, 47, 49, 369/50, 54, 58, 59, 60, 32, 124, 275.2, 275.4

[56] References Cited

U.S. PATENT DOCUMENTS 5,541,904  7/1996  Fite et al. .................. 369/54 X

FOREIGN PATENT DOCUMENTS

| 0294489 A1 | 12/1988 | European Pat. Off. . |
| 0342748 A1 | 11/1989 | European Pat. Off. . |
| 0418964 A1 | 3/1991 | European Pat. Off. . |
| 0535703 A2 | 4/1993 | European Pat. Off. . |
| 0635828 A1 | 1/1995 | European Pat. Off. . |
| 61-43334 | 3/1986 | Japan . |
| 3-76051 | 4/1991 | Japan . |
| 7-21697 | 1/1995 | Japan . |
| WO 86/04720 | 8/1986 | WIPO . |

Primary Examiner—Muhammad N. Edun
Attorney, Agent, or Firm—Limbach & Limbach L.L.P.

[57] ABSTRACT

The data record medium is adapted for recording medium information as unerasable data and copy management information. The medium information represents the type of data record medium including at least a read-only type and a write enable type. The copy management information represents whether information data recorded on the data record medium is a copy enable state or a copy prohibition state. The medium information and the copy management information are detected from the data record medium. The information data is read from the data record. The controlling unit for substantially prohibits the reproducing unit from outputting the information data when the medium information satisfies both a first condition representing that the medium information is not at least the read-only type and a second condition representing that the copy management information is the copy prohibition state.

12 Claims, 9 Drawing Sheets

INFORMATION DATA REPRODUCING SYSTEM, REPRODUCING APPARATUS, REPRODUCING METHOD, DATA FORMING APPARATUS, AND DATA RECORD MEDIUM

BACKGROUND OF THE INVENTION

1. Field of the Invention

The present invention relates to a information data reproducing system, and a reproducing apparatus, a method thereof, and a information data forming apparatus for copy-protecting a copy operation for data recorded on a data record medium such as an optical disc.

2. Description of the Related Art

As external storing units for use with computers, from view points of large storage capacity and high speed access, optical disc drives are becoming popular. CD-ROM (or CD-I (CD interactive)) drives and MO (magneto-optical disc) drives have been rapidly and widely used. An MO disc is one type of erasable discs. In addition, an MD (mini-disc) that is an erasable type disc has been proposed. Moreover, as a picture record medium, a DVD (digital video disc) is now under development.

The DVD is a reproduction-only disc with the same diameter as the diameter of the CD or a recordable/reproducible optical disc that is an MO type disc or a phase change type disc that reproduces or records/reproduces picture information compressed corresponding to the MPEG standard or the like. As well as the wavelength of laser rays decreases and the NA of an objective lens increases, the digital modulation and the error correction encoding process have been improved, the recording density has been further improved. In the case that the DVD is a single layer type disc, the data storage capacity is as much as around 3.7 Gbytes. The CD and MD were originally developed for digital audio discs. Thereafter, these discs have been used for external storage mediums for computers. Likewise, the DVD with much larger storage capacity than the CD and MD are expected to be used for external storage mediums for computers.

Conventionally, in the case that data recorded on such a data record medium should be copy-protected, a copy protection signal is recorded on the medium so that the drive side or the host computer recognizes the copy protection signal and prevents the copy operation.

However, in the conventional copy management method, when all data recorded on the medium is dump-copied, the copy operation cannot be prohibited. For instance, all of the data reproduced from a recording medium is temporarily stored in a hard disc and then all of the data stored in the hard disc is recorded onto a recording medium as merely '0' or '1' data. In this case the control data included in the reproduced data is treated as a meaningless data. In addition, when data of which each sector is protected is created, it takes a long time to recognize the protection of each sector and rewrite the copy protection signal.

OBJECTS AND SUMMARY OF THE INVENTION

Therefore, an object of the present invention is to provide an information data reproducing system, a reproducing apparatus, a method thereof, and a data forming apparatus that can prohibit data recorded on a medium from being reproduced even if all data of a medium is dump-copied so as to securely perform the copy protection of data recorded on the medium.

To accomplish the above-described object, the present invention is an information data reproducing system having a data record medium on which information data is recorded and a data reproducing apparatus for reproducing the information data from the data record medium, wherein medium information as unerasable data and copy management information are recorded on the data record medium, the medium information representing the type of data record medium including at least a read-only type and a write enable type, the copy management information representing whether information data recorded on the data record medium is a copy enable state or a copy prohibition state, and wherein the data reproducing apparatus comprises, detecting unit for detecting the medium information and the copy management information from the data record medium, reproducing unit for reading the information data from the data record medium and outputting the information data, and controlling unit for substantially prohibiting the reproducing unit from outputting the information data when both the medium information satisfies a first condition representing that the medium information is not at least the read-only type and the copy management information satisfies a second condition representing that the copy management information is the copy prohibition state.

Another feature of the invention is that there is provided an information data reproducing apparatus for reproducing information data from a data record medium on which information data and medium information are recorded as unerasable data, and copy management information is recorded, the medium information representing the type of the data record medium including at least a read-only type and a write enable type, the copy management information representing whether information data recorded on the data record medium is a copy enable state or a copy prohibition state, the apparatus comprising, detecting unit for detecting the medium information and the copy management information from the data record medium, reproducing unit for reading the information data from the data record medium and outputting the information data, and controlling unit for substantially prohibiting the reproducing unit from outputting the information data when both the medium information satisfies a first condition representing that the medium information is not at least the read-only type and the copy management information satisfies a second condition representing that the copy management information is the copy prohibition state.

Still another feature of the invention is that there is provided a data forming apparatus for forming unerasable information data in a read-only region of a record medium, comprising, unit for generating medium information representing that the read-only region of the record medium is a read-only state and copy management information representing that the read-only region is a copy enable state or a copy prohibition state, and forming unit for unerasably forming the information data, the medium information, and the copy management information in the read-only region.

With a combination of the medium information and the copy management information, even if all data is copied, the reproducing operation can be prohibited. Thus, the copy operation can be substantially prohibited.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
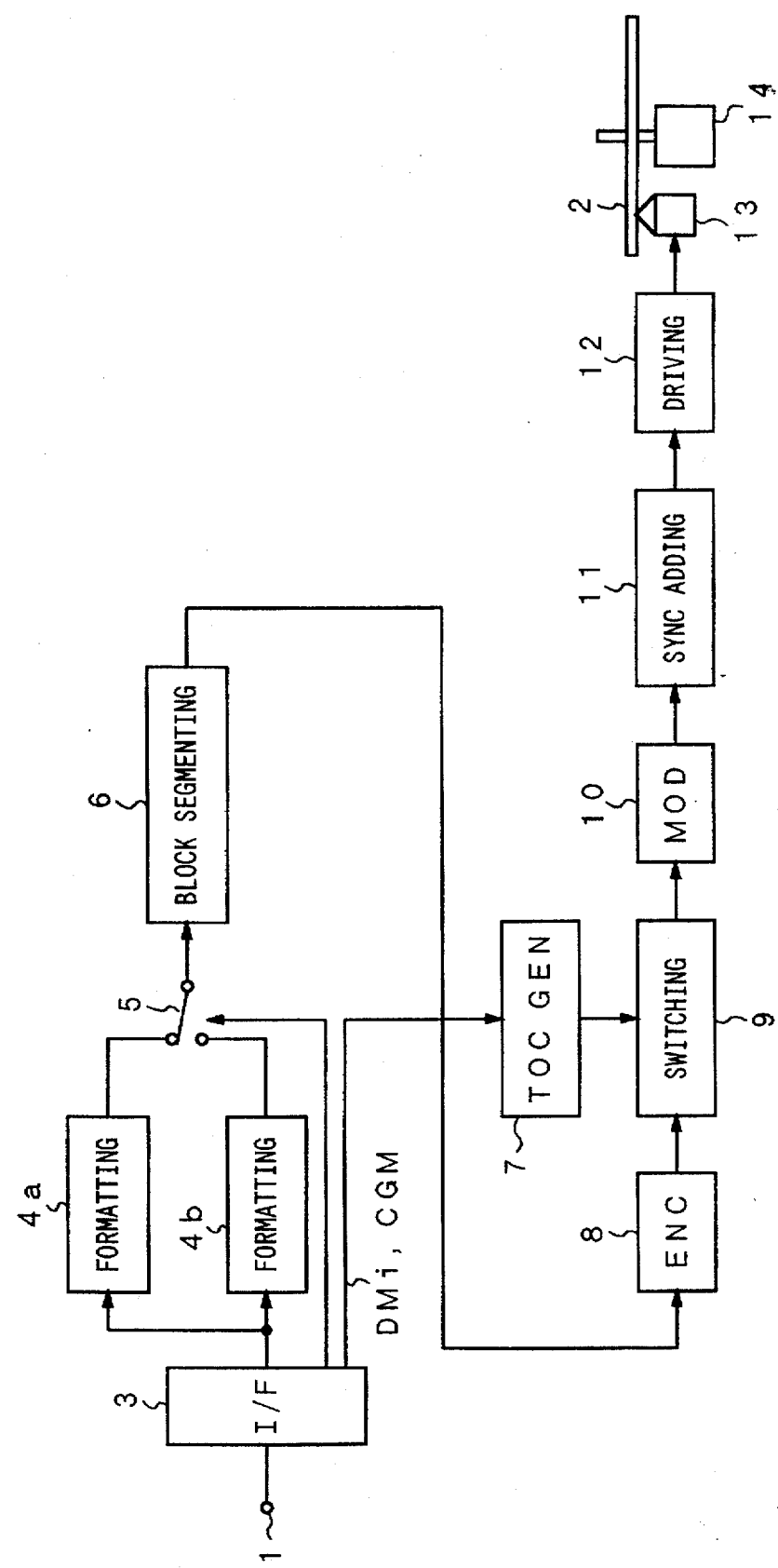
FIG. 1 is a block diagram showing a structure of a recording circuit according to an embodiment of the present invention.
Figure 2:
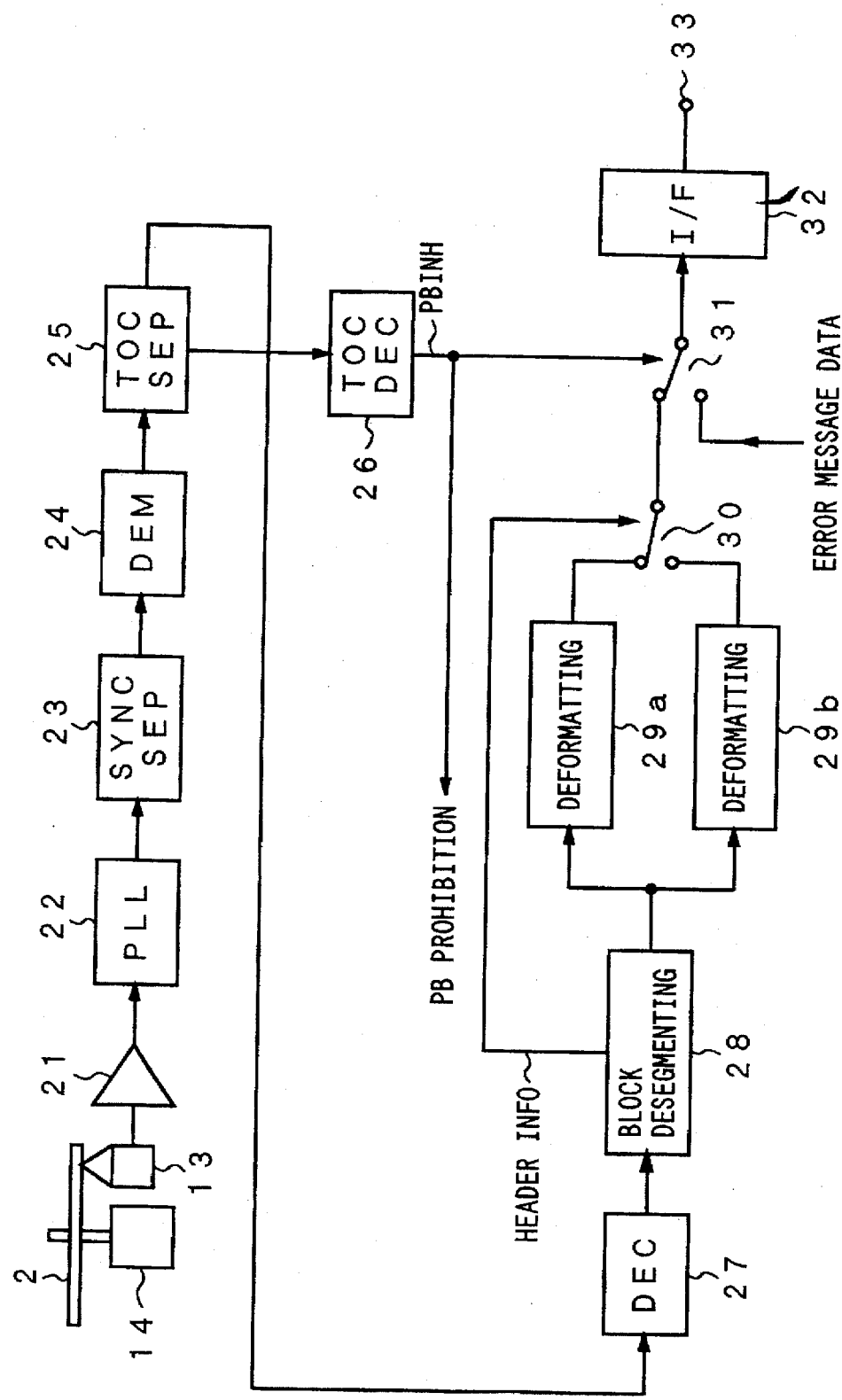
FIG. 2 is a block diagram showing a structure of a reproducing circuit according to an embodiment of the present invention.

Next, with reference to the accompanying drawings, an embodiment of the present invention will be described. FIG. 1 is a block diagram showing a structure of an optical disc recording system according to the present invention. FIG. 2 is a block diagram showing a structure of an optical disc reproducing system according to the present invention. In the recording system, record data is supplied from an input terminal 1. The record data is recorded on an optical disc 2. The record data is composed of video data, compressed audio data, data for a computer, and so forth. A magneto-optical type disc and a phase change type disc of DVDs that have been currently proposed are examples of the optical disc 2. A recordable optical disc 2 is referred to as a RAM type disc. That is, a RAM type disc is an erasable disc or a WO disc. Since the WO disc cannot record data more than twice, strictly speaking it is not a multiple recordable/reproducible disc. However, for convenience, the WO disc is categorized as the RAM type disc.

The recording system shown in FIG. 1 is applied for not only the recordable optical disc 2, but a mastering system for a read-only discs (referred to as a ROM type disc). In addition, the present invention can be applied for a hybrid disc (also referred to as a multi-session disc) of which the data region of one optical disc is divided into a recordable region and a reproduction-only region.

Figure 3:
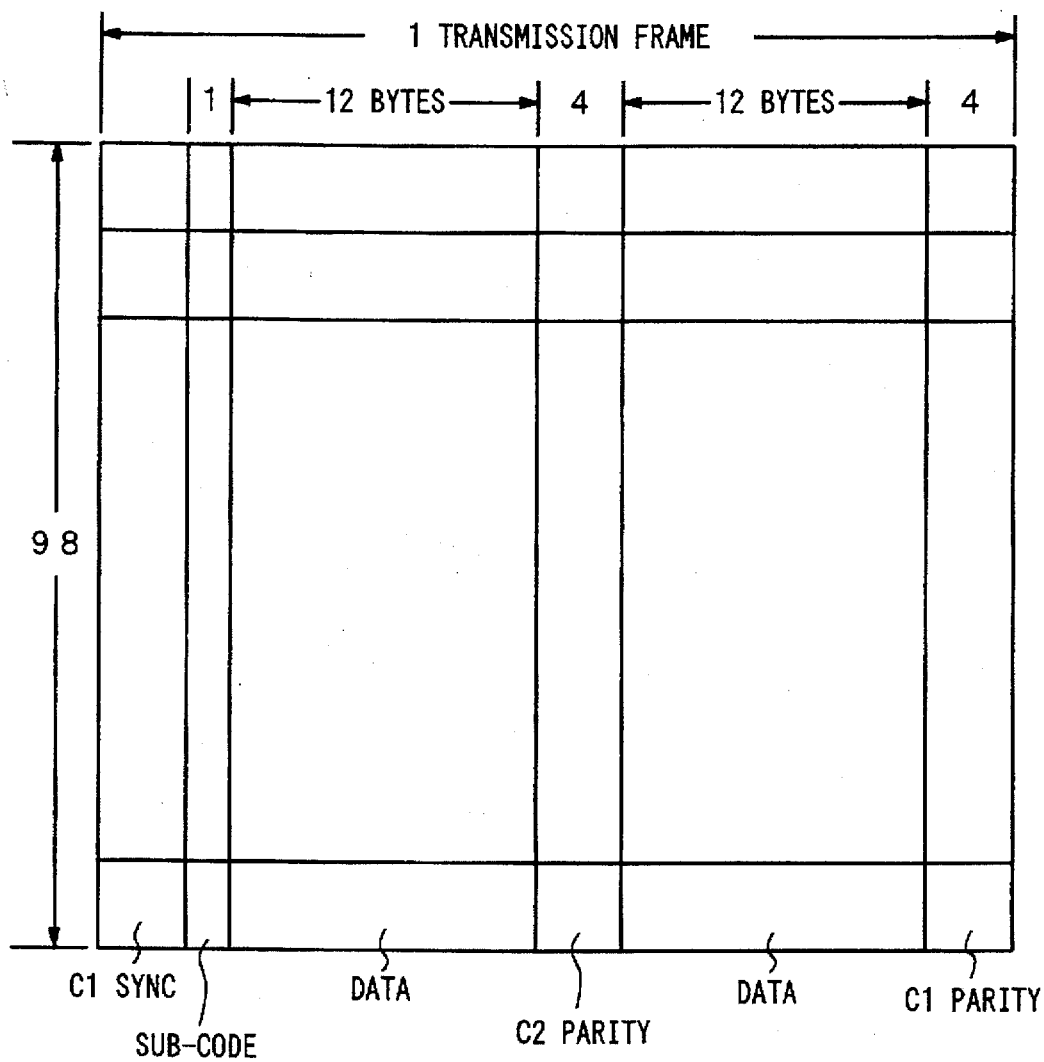
FIG. 3 is a schematic diagram for explaining a data structure of a CD.

Next, the data structure of the recording data according to the present invention, in particular, access data units (for recording or reproducing data) will be described. The CD-ROM, which is an example of the read-only disc, was derived from the known CD (digital audio disc DAD). As shown in FIG. 3, on the CD, a transmission frame has a sub-code of 1 byte, data of 24 bytes, a C1 parity of 4 bytes, and a C2 parity of 4 bytes. On the CD, each byte of data is converted into 14-channel-bit code word by the EFM modulation. The resultant code words are recorded with connection bits (3-channel bits). Inverted intervals of 11T (where T is a period of channel bits) are successively disposed at the beginning of each transmission frame. Thereafter, a 2-channel bit is added. Thus, a sync of a total of 24-channel bits is disposed. The sync represents a synchronous signal.

One sub-code is composed of 98 transmission frames. Thus, on an CD-DA, 98 transmission frames include user data of 24 bytes×98=2352 bytes.

Figure 4:
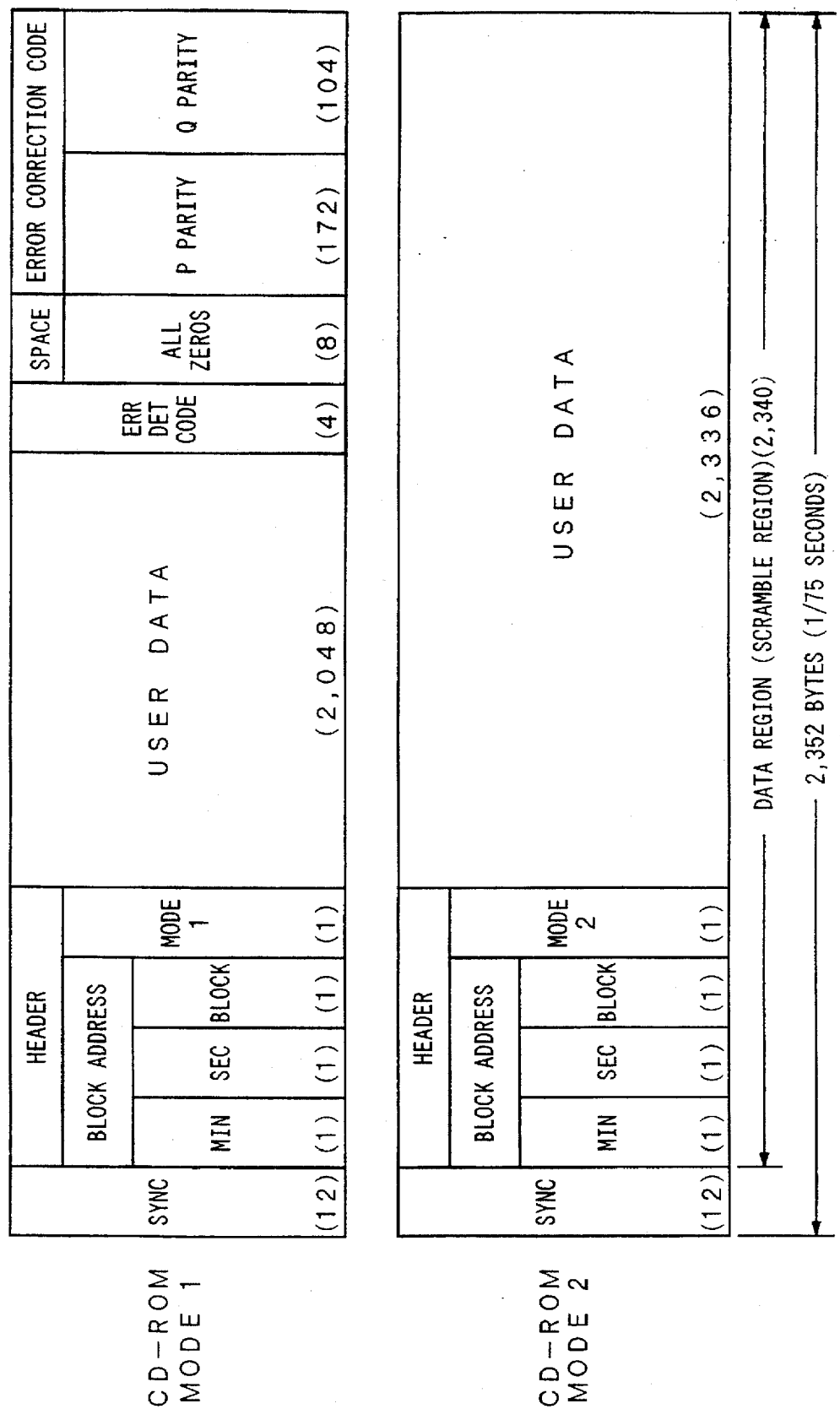
FIG. 4 is a schematic diagrams for explaining data structures of CD-ROMs.

The data structure of the CD-ROM is defined corresponding to the transmission format of the CD. In other words, the access unit of the CR-ROM is 2352 bytes that is data in 98 frames, which is a period of a sub-code. This access unit is also referred to as a block. However, in the following description, the access unit is referred to as a sector. FIG. 4 is a schematic diagram showing a data structure of one sector of the CD-ROM.

In the CD-ROM, mode 0, mode 1, and mode 2 have been defined. In each of these modes, a sync (12 bytes) that is a delimiter of a sector and a header (4 bytes) are added. In the mode 0, all data other than the sync and header is "0" and is used as dummy data. FIG. 4 show data structures of sectors of the mode 1 and the mode 2. The header is composed of address information of 3 bytes and mode information of one byte as with the sub-code of the CD.

In the data structure of the mode 1, the user data is composed of 2,048 (2K) bytes. To enhance the error correction performance, auxiliary data of 288 bytes is added to the user data. In other words, an error detection code (4 bytes), a space (equivalent to 8 bytes), a P parity (172 bytes), a Q parity (104 bytes) are added to the user data. The mode 1 is suitable for recording high reliability data as with character code and computer data. In the mode 2, auxiliary data of 288 bytes is not added. Thus, user data of 2,336 bytes can be recorded. The mode 2 is suitable for recording data of which an error can be interpolated as with video data and audio data.

Figure 5:
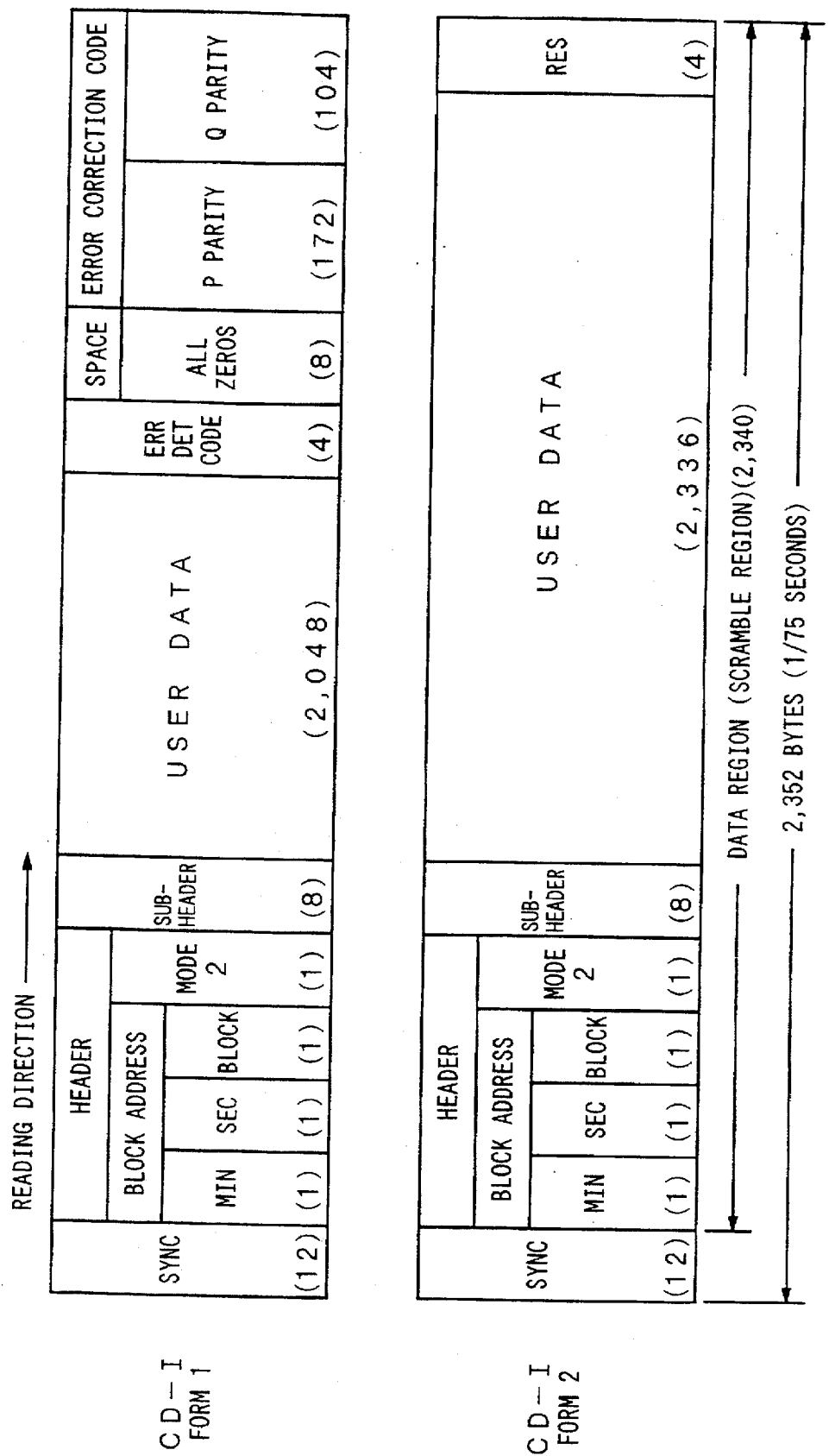
FIG. 5 is a schematic diagrams for explaining data structures of CD-Is.

In addition, as another ROM type disc similar to the CD-ROM, a CD-I has been standardized. FIG. 5 is a schematic diagram showing data structures of sectors of the CD-I. As with the CD-ROM, a sync of 12 bytes and a header of 4 bytes are added. The mode information of the header represents the mode 2. In the CD-I, a sub-header of 8 bytes is preceded by the header of 4 bytes. The sub-header is composed of a file number of 2 bytes, a channel number of 2 bytes, a sub-mode of 2 bytes, and a data type of 2 bytes.

In addition, as with the mode 1 and the mode 2 of the CR-ROM, in the CD-I, form 1 and form 2 have been defined. In the form 1, an error detection code of 4 bytes, a P parity of 172 bytes, and a Q parity of 104 bytes are added. However, since a space is not disposed unlike with the mode 1 of the CD-ROM, the user data is composed of 2,048 bytes. In the form 2, a reserved region (of 4 bytes) is disposed. Thus, the user data is composed of 2,324 bytes.

Figure 6A:
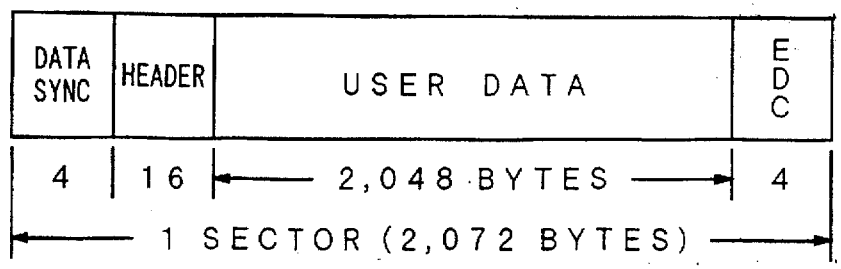
FIGS. 6A and 6B are schematic diagrams showing data structures of sectors according to an embodiment of the present invention.

FIG. 6A is a schematic diagram showing a data structure of one sector in such cases where the data from a computer is recorded on the optical disc 2. Referring to FIG. 6A, a data sync (4 bytes) and a header (16 bytes) are added to user data (2,048 bytes). In addition, to enhance the reliability, an error detection code EDC (4 bytes) is added to the user data. Thus, the length of one sector is 2,072 bytes.

Figure 6B:
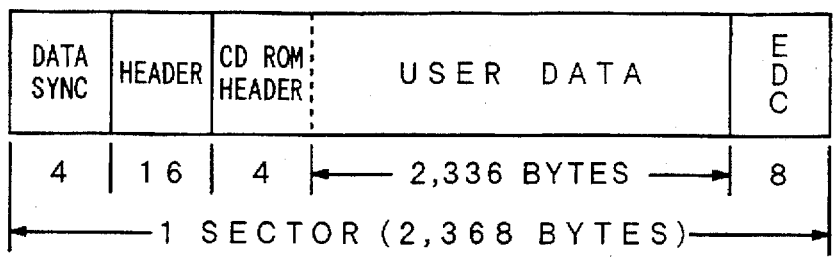

On the other hand, since the user data in for example the mode 2 of the above-described CD-ROM is composed of 2,336 bytes, as shown in FIG. 6B, a data sync (4 bytes), and an error detection code EDC is added to the user data. In addition, a header (4 bytes) of the CD-ROM is disposed. However, the header of the CR-ROM may be omitted. In this case, the size of the user data becomes 2,340 bytes. Thus, the length of one sector is 2,368 bytes. The data sync, the header, and the error detection code EDC of the data shown in FIG. 6A are preferably the same as those of the data shown in FIG. 6B.

Thus, the length of sectors of the RAM type disc is different from that of the ROM type disc. In addition, the sizes of these two types of the sectors do not have a relation of integers. In this embodiment, when two different sector sizes are denoted by A and B, blocks are defined so that nA and mB (where n and m are integers and the relations of n≠m and n> m are satisfied) become predetermined data units referred to as blocks). Data is recorded/reproduced namely, accessed) as blocks. "n" and "m" are defined in such a manner that the relation of m=n−1 is satisfied (this method is referred to as first method). Alternatively, "n" and "m" are defined in such a manner that the relation of n=$2^j$ (where j is a natural number) is satisfied (this method is referred to as second method). This first method is used when the block size is minimized. The second method is used when data of discs is used for a computer system.

In the above-described example, when "n" and "m" are 8 and 7, respectively, the lengths of user data of the two types of sectors are:

2,048 bytes×8=16,384 bytes
2,336 bytes×7=16,352 bytes

Thus, the lengths of the user data of these sectors are smaller than the length of a block of 16 Kbytes (16,384 bytes).

As shown in FIGS. 6A and 6B, when sectors include the data sync and the header (the length of the data sync and the header is 20 bytes in total), since A' is 2,072 bytes and B' is 2,368, if "n" and "m" are 8 and 7, respectively, the block size becomes:

2,072×8=2,368×7=16,576 bytes

Thus, the common block size can be defined.

Figure 7:
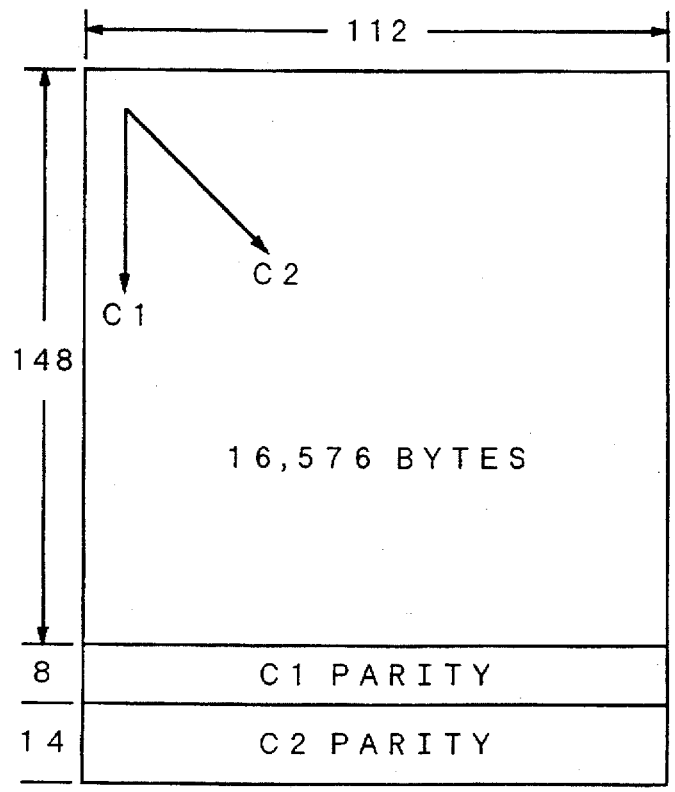
FIG. 7 is a schematic diagram showing a data structure of a block according to an embodiment of the present invention.

In this case, as a data structure of one block, as shown in FIG. 7, a two-dimensional array of (148×112=16,576 bytes) is defined. When an error correction code is applied for the two-dimensional array, the error correction performance can be enhanced. As an error correction encoding operation, a folding type dual encoding method can be used. In this case, data of 162 bytes in vertical direction (each row) is encoded with a first error correction code so as to generate a C1 parity of 8 bytes. Thereafter, data of 156 bytes in a diagonal direction is encoded with a second error correction code (referred to as C2 code) and add a C2 parity of 14 bytes.

As well as these error correction codes, a product code, a block type dual code, an LDC (long distance code), and so forth may be used. In addition, an error detection code may be simply used to perform the encoding process.

Figure 8A:
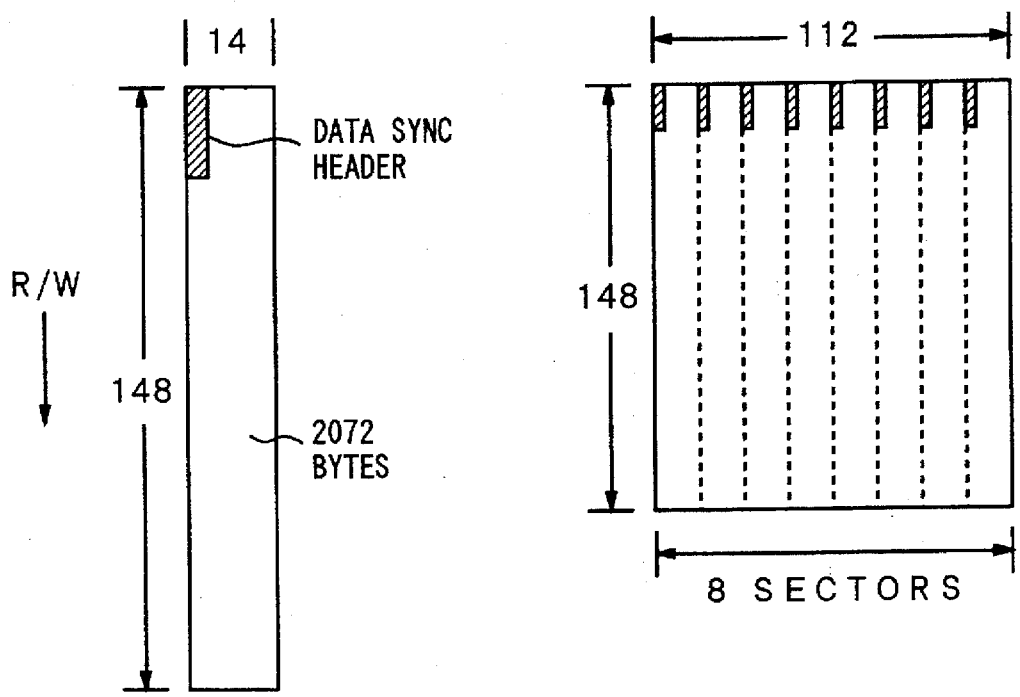
FIGS. 8A and 8B are schematic diagrams showing the relation of sectors and blocks according to an embodiment of the present invention.

Next, the case that two sectors with different sizes are integrated into a block with the same size will be described with reference to FIGS. 8A and 8B. FIG. 8A is a schematic diagram showing a process for a sector of 2,072 bytes shown in FIG. 6A. One sector is delimited every 148 bytes in R/W directions so as to form a two-dimensional array of 148× 14=2,072 bytes. Thus, a data structure of which one block is composed of eight sectors is formed.

Figure 8B:
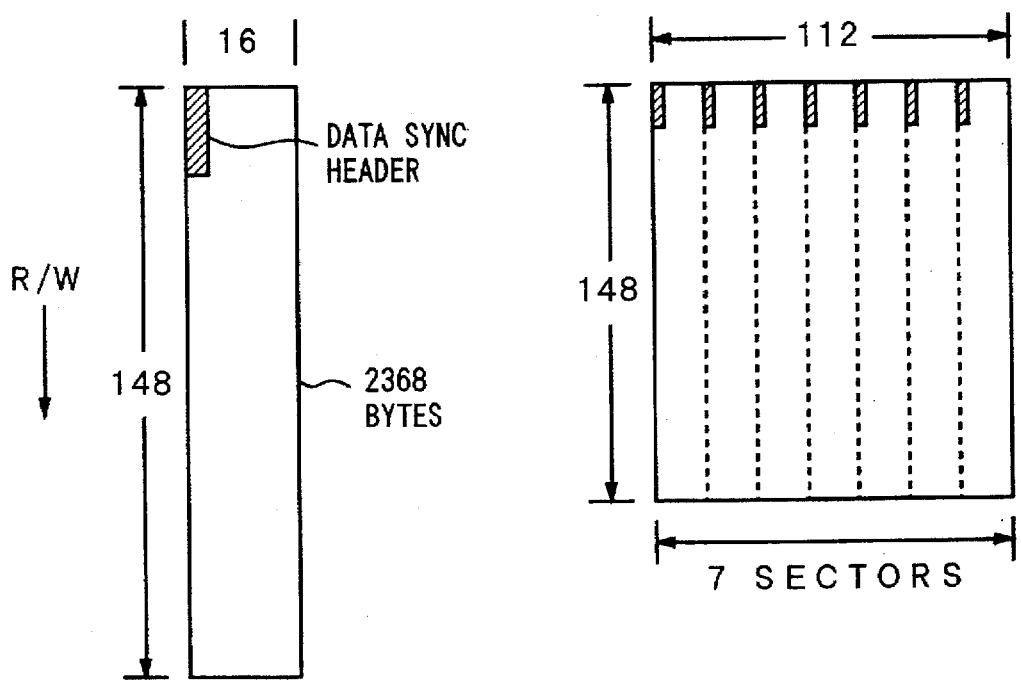

FIG. 8B is a schematic diagram showing a process for a sector of 2,368 bytes. One sector is delimited every 148 bytes in the R/W directions. Thus, a two dimensional array of 148×16=2,368 bytes is formed. Thus, a data structure of which one block is composed of seven sectors is formed. When data is recorded/reproduced, a counter counts 2,072 bytes or 2,368 bytes of data so as to detect seven or eight center syncs. Thus, delimiters of blocks are detected. In addition to this method, a block sync other than a center sync may be added.

Figure 9:
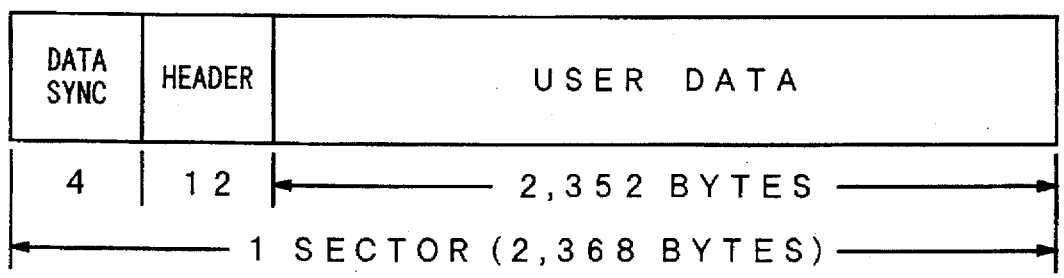
FIG. 9 is a schematic diagram showing another data structure according to an embodiment of the present invention.

In addition, according to the present invention, the data structure of the CD-DA (digital audio) can be used as the common block structure of the above-described discs. In the case of the CD-DA, 98 transmission frames include user data of 2,352 bytes. As shown in FIG. 9, a data sync of 4 bytes and a header of 12 bytes are added to user data. Thus, the size of one sector becomes 2,368 bytes. Consequently, as with a sector of the above-described CD-ROM, seven sectors of the CD-DA can be placed in one block.

Returning to FIG. 1, the recording system according to the embodiment of the present invention will be described. The digital data received from the input terminal 1 is supplied to formatting circuits 4a and 4b through an interface 3 (such as an SCSI interface). The formatting circuits 4a and 4b delimit the received digital data by sectors. Thereafter, the formatting circuits 4a and 4b each adds a data sync and a header to each sector and performs an error correction code encoding operation. In other words, when the received data has the data structure based on 2K bytes unit, the formatting circuit 4a converts the received data into a sector structure (2,072 bytes) as shown in FIG. 6A. On the other hand, when the received data is the reproduction data of the CD-ROM, the formatting circuit 4b converts the received data into a sector structure (2,368 byte) as shown in FIG. 6B.

One of two types of output data of the formatting circuits 4a and 4b is selected by a switching circuit 5 and then supplied to a block segmenting circuit 6. The switching circuit 5 is controlled corresponding to a format ID signal that is output from the interface 3. The switching circuit 5 is switched corresponding to data received data from the interface 3. When the received data has the data structure based on 2K bytes unit, the switching circuit 5 selects the output signal of the formatting circuit 4a. When the received data is the reproduction data of the CD-ROM, the switching circuit 5 selects the output signal of the formatting circuit 4b.

As will be described later, the medium ID signal DMi and copy management information CGM are supplied to a TOC (Table of Contents) generating circuit 7. The TOC generating circuit 7 generates TOC data including these types of information. The TOC data includes disc control information and directory information. The TOC data is recorded on for example the innermost peripheral track. When the disc is mounted on the drive, the TOC data is read. In this case, since the medium ID signal DMi is intrinsic to the medium, it is preferably pre-formed as a part of the TOC data of the medium. As the pre-forming technique, known method (for example embossing) can be used.

The block segmenting circuit 6, which receives the output signal of the switching circuit 5, segments blocks composed of 7 sectors or 8 sectors and encodes each block with an error correction code. The output data of the block segmenting circuit 6 is supplied to an error correction code encoder 8. The encoder 8 performs an encoding process with for example a folding type dual code type error correction code. This error correction code encoding process is the same as that used in the CD. In other words, an interleaving process is performed so that data symbols are dually included in two encoding sequences referred to as a C1 code and a C2 code and that each code sequence is composed of a different data symbol.

The error correction code may be switched corresponding to the type of the disc 2 with the medium ID signal DMi. For example, the block type dual code encoding process is used for a RAM type disc, whereas the folding type dual encoding process is used for a ROM type disc. Alternatively, the interleave length of the dual encoding process for the RAM type disc may be shorter than that for the ROM type disc.

The output signal of the error correction code encoder 8 is supplied to a switching circuit 9. The switching circuit 9 switches between the error correction code encoding output data and the TOC data received from the TOC generating circuit 7 and outputs the switched data to a digital modulating circuit 10. The digital modulating circuit 10 maps a data symbol of for example one byte (eight bits) into a 16-bit code word corresponding to a predetermined table so as to generate a modulation output with less DC component. Of course, the EFM method for the CD, the 8–15 modulation method for converting an 8-bit data symbol into a 15-bit code word, or the like may be used as the digital modulation method. The output signal of the digital modulating circuit 10 is supplied to a sync adding circuit 11.

The sync adding circuit 11 adds a predetermined sync to the transmission frame. For example, the C1 code sequence composed of 170 data symbols generated by the error correcting encoder 8 is divided into 85 data symbols. The 85 data symbols are converted form an 8-bit data symbol into a 16-bit code word. The resultant data is treated as one transmission frame. A frame sync is added to the beginning of each transmission frame. In addition, a sector sync instead of a frame sync is added to each sector. Moreover, a block sync instead of a sector sync is added to each block. These syncs have a special bit pattern. The length of these syncs is for example 32 channel bits. These syncs are not present in modulated data. The output signal of the sync adding circuit 11 is supplied to an optical pickup 13 through a driver 12. The output signal of the optical pickup 13 is recorded on the optical disc 2 by magneto-optical recording method or phase change method. The optical disc 2 is rotated by a spindle motor at CLV (constant linear velocity) or CAV (constant angular velocity). The minimum unit of data recorded/reproduced by the optical pickup 13 is one block.

In the embodiment of the present invention, for example, the medium ID signal DMi recorded as TOC data is defined as follows.

Medium ID signal DMi (two bits a and b)
  a=0, b=0: ROM type (For example, when the optical disc 2 is the mastering disc of CD-ROMs)
  a=0, b=1: not used
  a=1, b=0: RAM type (WO)
  a=1, b=1: RAM type (erasable) (For example, when the optical disc 2 is the erasable type of DVD)

The copy management information CGM is defined as follows.

Copy management information CGM (two bits c and d)
  c=0, d=0: copy enabled
  c=0, d=1: not used
  c=1, d=0: copy enabled for first generation
  c=1, d=1: copy prohibited Next, a reproducing circuit that reproduces data from an optical disc 2 on which data has been recorded will be described with reference to FIG. 2. The optical disc 2 is a RAM type disc or a ROM type disc. The medium type is distinguished corresponding to the medium ID signal DMi included in TOC data. In FIG. 2, reference numerals of the optical disc 2, an optical pickup 13, and a spindle motor 14 are the same as those of the recording circuit shown in FIG. 1. However, it should be noted that the recording operation and the reproducing operation are not performed by the same apparatus. In particular, when the disc 2 is a ROM type disc, the recording apparatus shown in FIG. 1 is a mastering system. The reproducing apparatus shown in FIG. 2 is a ROM drive.

Reproduction data read by the optical pickup 13 is supplied to a PLL circuit 22 through an RF amplifier 21. The PLL circuit 22 extracts a clock from the reproduction data. On the recording side and the reproducing side, a servo controlling circuit (not shown) is disposed. The servo controlling circuit controls a focus servo operation, a tracking servo operation, a seek operation, and a laser power (in the record mode) of the optical pickup 13. The output data of the PLL circuit 22 is supplied to a sync separating circuit 23. A frame sync, a sector sync, a block sync, and sync detection signals thereof are generated by the sync separating circuit 23. These sync signals are supplied to a timing generating circuit (not shown). The timing generating circuit generates various timing signals for a sector period, a block period, and so forth in synchronization with the reproduction data.

A digital demodulating circuit 24 is connected to the sync separating circuit 23. A code word is converted into a data symbol by the digital demodulating circuit 24 in the reverse process as the digital modulating circuit 10. The output data of the digital demodulating circuit 24 is supplied to a TOC separating circuit 25. The TOC separating circuit 25 sends TOC data to a TOC decoder 26 when the disc 2 has been mounted. The TOC decoder 26 decodes the TOC data and outputs various directory information and control information. The medium ID signal DMi and the copy management information CGM are also obtained from the reproduction TOC data.

The reproduction data received from the TOC separating circuit 25 is supplied to an error correction code decoder 27. The decoder 27 corrects an error of the reproduction data. The output data of the decoder 27 is supplied to a block desegmenting circuit 28. The block desegmenting circuit 28 delimits the reproduction data by blocks and decodes an error correction code for each block. The block desegmenting circuit 28 performs the reverse process of the block segmenting circuit 6 on the recording side and outputs sector data. The block desegmenting circuit 28 is connected to deformatting circuits 29a and 29b. The output signals of the deformatting circuits 29a and 29b are switched by a switching circuit 30.

The deformatting circuit 29a performs the reverse process of the formatting circuit 4a on the recording side. The deformatting circuit 29b performs the reverse process of the formatting circuit 4b. The deformatting circuit 29a extracts user data of 2,048 bytes from a sector shown in FIG. 6A and detects an error. The deformatting circuit 29b extracts user data of 2,336 bytes from a sector shown in FIG. 6B and detects an error.

One of the two types of the output signals of the deformatting circuits 29a and 29b is selected by the switching circuit 30. The output signal of the switching circuit 30 is supplied to a switching circuit 31. The data selected by the switching circuit 31 is supplied to an interface 32. The reproduction data is output from the interface 32 to an output terminal 33. The switching circuit 30 is controlled corresponding to the header information which is detected by the block desegmenting circuit 28. The switching circuit 30 selects the output signal of the circuit 29a or the circuit 29b that performs the process corresponding to the sector structure of data that has been reproduced.

The switching circuit 31 is controlled corresponding to a reproduction prohibition (playback inhibition) signal PBINH. The reproduction data selected by the first switching circuit 30 is supplied to one input terminal of the switching circuit 31. Error message data is supplied to the other input terminal of the switching circuit 31. The reproduction prohibition signal PBINH is generated corresponding to the medium ID signal DMi and the copy management information CGM. The bit "a" of the medium ID signal DMi and the bits "b" and "d" of the copy management information CGM are ANDed (namely, a·c·d) and output as the reproduction prohibition signal PBINH. In other words, when PBINH=(a·c·d)="1", the reproduction prohibition operation is performed. The switching circuit 31 selects the error message data. When PBINH="0", the reproducing operation is not prohibited.

When the reproduction prohibition signal PBINH is "1", the switching circuit 31 outputs the error message data through the interface 32. The computer side connected to the output terminal 33 interprets the error message and outputs on a display a message that represents that data cannot be copied due to the disc has been copy-protected. If necessary, the reproduction prohibition signal PBINH may cause the optical pickup 13 to return to the initial position so that the apparatus enters an standby state. Alternatively, even if data recorded on the optical disc 2 is reproduced, the reproduction prohibition signal PBINH may cause the apparatus to output incorrect data. Thus, prohibiting operation for the reproduction signal output is substantially performed.

When the medium ID signal DMi is (10) (namely, the optical disc 2 is a WO disc) or (11) (namely, the optical disc 2 is an erasable disc) and the copy management information CGM is (11) (namely, the optical disc 2 is copy-protected), the reproduction prohibition signal PBINH becomes "1" and the reproduction operation is prohibited. When the copy management information CGM of data recorded on the optical disc 2 has been copy-protected, the reproduction prohibition signal PBINH is "1", thereby causing the reproducing operation to be prohibited.

Even if all data including the TOC of which the medium ID signal DMi of the optical disc 2 to be reproduced is (00) (namely, the optical disc 2 is a ROM type disc) is copied, since the medium ID signal DMi of the optical disc on which copied information has been recorded is (10) or (11), the reproducing operation is disabled. Thus, the copy operation can be substantially prohibited. In the case that the optical disc 2 is a ROM type disc, when another optical disc recording apparatus is connected to the output terminal 33, the copy operation can be performed. However, when the copy prohibition management information has been recorded on the optical disc 2, even if data on the optical disc 2 can be copied, the data recorded on the optical disc cannot be reproduced. Thus, the copy operation can be substantially prohibited.

Figure 10:
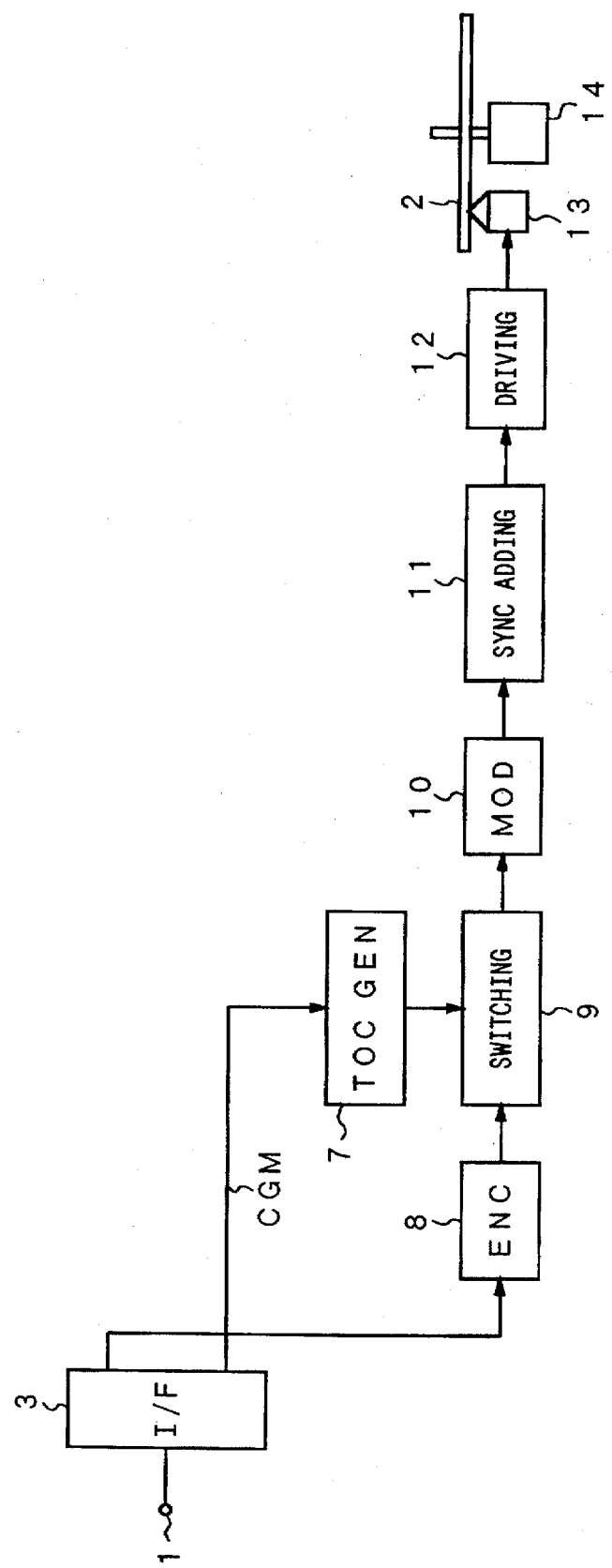
FIG. 10 is a block diagram showing a structure of a recording circuit according to another embodiment of the present invention.

FIG. 10 is a block diagram showing a structure of a record side according to a simplified embodiment of the present invention. In this embodiment, the number of formats of record data supplied to an interface 3 is only one. For example, reproduced data of a CD-ROM is received. The received data is digitally modulated with the same format as the CD-ROM and recorded on a RAM-type optical disc 2 (CD-WO or CD-RAM). As another example, the reproduced data of a DVD-ROM is recorded on a DVD-RAM. Thus, the formatting circuits 4a and 4b, the switching circuit 5, and the block segmenting circuit 6 are omitted from the structure of the above-described embodiment (shown in FIG. 1). For simplicity, in FIG. 10, similar portions to those in FIG. 1 are denoted by similar reference numerals and their description is omitted.

Figure 11:
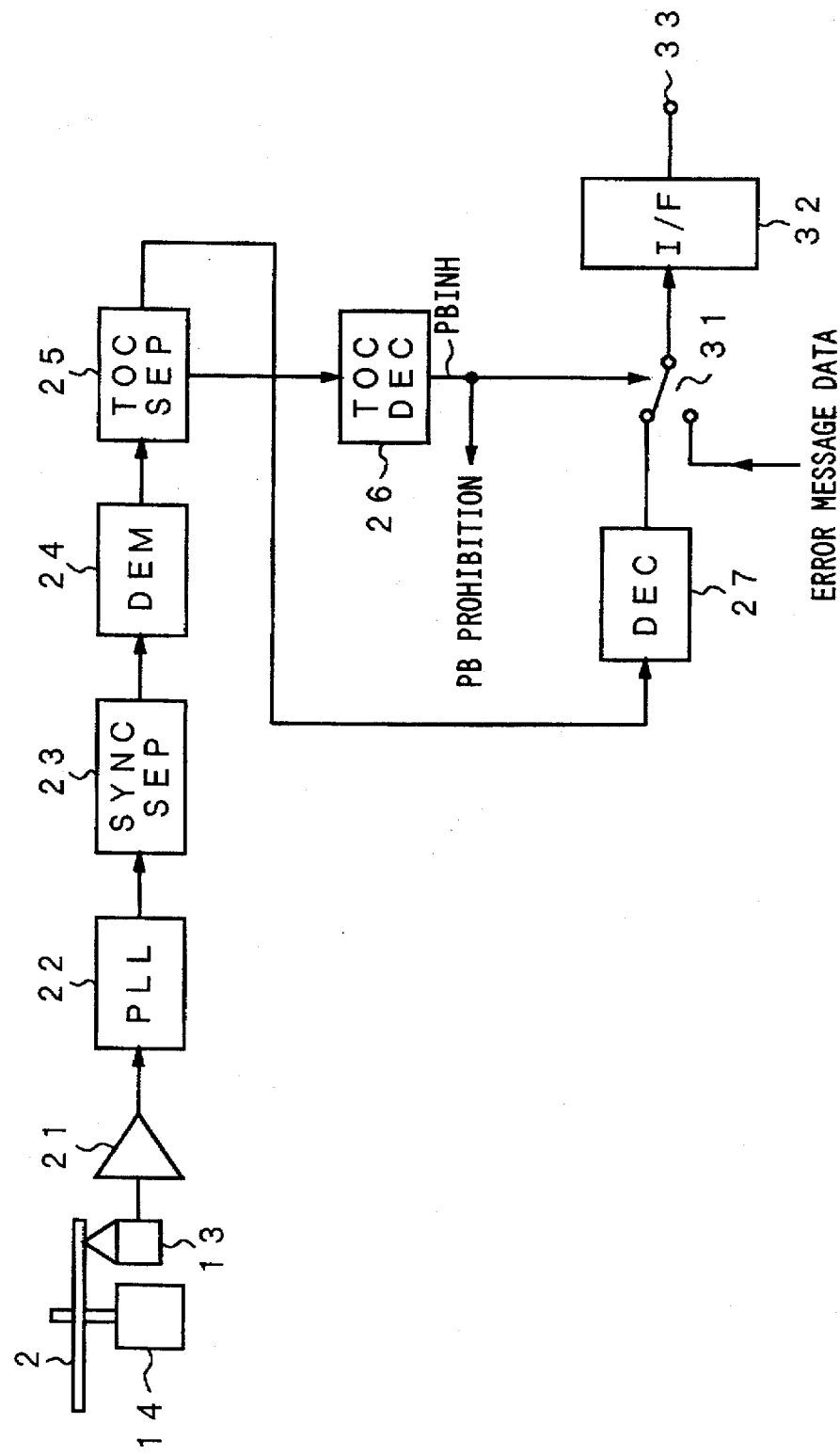
FIG. 11 is a block diagram showing a structure of a reproducing circuit according to another embodiment of the present invention.

FIG. 11 is a block diagram showing a structure of a reproduction side corresponding to the record side shown in FIG. 10. As with the above-described embodiment, a reproduction prohibition signal PBINH is generated with a medium ID signal DMi representing the type of the medium and copy management information CGMS and stored on a disc 2. When the DMi reproduced from the disc 2 is (10) or (11) and the CGMS thereof is (11), the reproduction prohibition signal PBINH substantially prohibits the reproduced data from being output. Thus, the block desegmenting circuit 28, the deformatting circuits 29a and 29b, and the switching circuit 30 are omitted from the structure of the above-described embodiment (shown in FIG. 2). For simplicity, in FIG. 11, similar portions to those in FIG. 2 are denoted by similar reference numerals and their description is omitted.

The number of bits of the copy management information CGM can be increased to 2 or more so as to precisely designate the copy management information. In the above-described embodiment, the medium ID signal and the copy management information are recorded as the TOC data that includes directory information. However, the medium ID signal and/or the copy management information may be recorded for each sector. Thus, the copy operation can be managed for each sector. When the present invention is applied for a hybrid disc of which a part of the recording region of one disc is a RAM type and the rest is a ROM type (this disc is also referred to as a multi-session disc), the medium ID signal and the copy management information should be recorded to at least each region.

When a RAM type copy-protecting data record medium is created, a region for recording RAM type copy management information is separated from a region for storing ROM type copy management information. In the region for storing the RAM type copy management, user copy management information (copy protection) can be recorded. Thus, the present invention can be applied integrally for the RAM type data record medium and the ROM type data record medium.

As described above, the present invention is not limited to the same block structure of a ROM type optical disc and a RAM type optical disc. In other words, the data structure (for example, the sector structure) of a ROM type optical disc may be the same as that of a RAM type optical disc. Alternatively, these structures may be independently defined. In addition, the present invention can be applied for a semiconductor memory or a magnetic tape with a large storage capacity as a data record medium as well as a disc shaped record medium.

According to the present invention, with a combination of medium information and copy management information, even if all data is copied, the reproducing operation is prohibited. Thus, the copying operation is substantially prohibited. In particular, when the present invention is applied for a disc with a large storage capacity such as a DVD, computer data such as video software and computer software can be copy-protected.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. An information data reproducing system having a data record medium on which information data is recorded and a data reproducing apparatus for reproducing the information data from the data record medium, wherein medium information as unerasable data and copy management information are recorded on the data record medium, the medium information representing the type of data record medium including at least a read-only type and a write enable type, the copy management information representing whether information data recorded on the data record medium is a copy enable state or a copy prohibition state, and wherein the data reproducing apparatus comprises:

detecting means for detecting the medium information and the copy management information from the data record medium;

reproducing means for reading the information data from the data record medium and outputting the information data; and controlling means for substantially prohibiting said reproducing means from outputting the information data when both the medium information satisfies a first condition representing that the medium information is not at least the read-only type and the copy management information satisfies a second condition representing that the copy management information is the copy prohibition state.

2. The information data reproducing system as set forth in claim 1, wherein said controlling means is adapted for causing said reproducing means to output data representing that the reproduction of information data is prohibited instead of outputting the information data when the medium information and the copy management information satisfy the first condition and the second condition, respectively.

3. The information data reproducing system as set forth in claim 1, wherein the data record medium has a record region that is divided into a plurality of sub-regions each for recording respective medium information.

4. The information data reproducing system as set forth in claim 1, wherein the data record medium has a record region that is divided into a plurality of sub-regions each for recording respective copy management information.

5. An information data reproducing apparatus for reproducing information data from a data record medium on which information data and medium information are recorded as unerasable data, and copy management information is recorded, the medium information representing the type of the data record medium including at least a read-only type and a write enable type, the copy management information representing whether information data recorded on the data record medium is a copy enable state or a copy prohibition state, the apparatus comprising:

detecting means for detecting the medium information and the copy management information from the data record medium;

reproducing means for reading the information data from the data record medium and outputting the information data; and controlling means for substantially prohibiting said reproducing means from outputting the information data when both the medium information satisfies a first condition representing that the medium information is not at least the read-only type and the copy management information satisfies a second condition representing that the copy management information is the copy prohibition state.

6. The information data reproducing apparatus as set forth in claim 5, wherein said controlling means is adapted for causing said reproducing means to output data representing that the reproduction of information data is prohibited instead of outputting the information data when the medium information and the copy management information satisfy the first condition and the second condition, respectively.

7. The information data reproducing apparatus as set forth in claim 5, wherein the data record medium has a record region that is divided into a plurality of sub-regions each for recording respective medium information.

8. The information data reproducing apparatus as set forth in claim 5, wherein the data record medium has a record region that is divided into a plurality of sub-regions each for recording respective copy management information.

9. An information data reproducing method for reproducing information data from a data record medium on which information data and medium information are recorded as unerasable data, and copy management information is recorded, the medium information representing the type of the data record medium including at least a read-only type and a write enable type, the copy management information representing whether information data recorded on the data record medium is a copy enable state or a copy prohibition state, the method comprising the steps of:

detecting the medium information and the copy management information from the data record medium; and substantially prohibiting the information data from being output when both the medium information satisfies a first condition representing that the medium information is not at least the read-only type and the copy management information satisfies a second condition representing that the copy management information is the copy prohibition state.

10. The information data reproducing method as set forth in claim 9, wherein the prohibition step is performed by outputting data representing that the reproduction of information data is prohibited instead of outputting the information data when the medium information and the copy management information satisfy the first condition and the second condition, respectively.

11. A data forming apparatus for forming unerasable information data in a read-only region of a record medium, comprising:

means for generating medium information representing that the read-only region of the record medium is a read-only state and copy management information representing that the read-only region is a copy enable state or a copy prohibition state; and forming means for unerasably forming the information data, the medium information, and the copy management information in the read-only region.

12. A copy prohibiting method, comprising the steps of:

unerasably forming medium information representing that a record medium is a write enable state to a writable record medium;

unerasably forming medium information representing a read-only state and copy management information representing a copy enable state or a copy prohibition state to a read-only record medium;

detecting the medium information and the copy management information from a record medium; and substantially prohibiting information data from being output from the record medium when the medium information represents the write enable state and the copy management information represents the copy prohibition state.

* * * * *